United States Patent [19]
Takeda

[11] Patent Number: 6,074,010
[45] Date of Patent: Jun. 13, 2000

[54] HEADREST APPARATUS FOR VEHICLE SEAT

[75] Inventor: Nobuhiko Takeda, Aichi pref., Japan

[73] Assignee: Aisin Seiki Kabushiki Kaisha, Kariya, Japan

[21] Appl. No.: 09/027,739

[22] Filed: Feb. 23, 1998

[30] Foreign Application Priority Data

Feb. 25, 1997  [JP]  Japan ................................. 9-041141

[51] Int. Cl.$^7$ .................................................. A47C 7/36
[52] U.S. Cl. ......................... 297/391; 297/408; 297/410
[58] Field of Search ................................... 297/410, 404, 297/408, 391, 403

[56] References Cited

U.S. PATENT DOCUMENTS

| | | | |
|---|---|---|---|
| 4,113,310 | 9/1978 | Kapanka | 297/408 |
| 4,678,232 | 7/1987 | Ishida et al. | 297/408 |
| 4,711,494 | 12/1987 | Duvenkamp | 297/408 X |
| 5,011,225 | 4/1991 | Nemoto | 297/410 X |
| 5,145,233 | 9/1992 | Nagashima | 297/408 |
| 5,669,668 | 9/1997 | Leuchtmann | 297/408 |
| 5,895,094 | 4/1999 | Mori et al. | 297/391 X |
| 5,906,414 | 5/1999 | Rus | 297/408 |

FOREIGN PATENT DOCUMENTS 2-46755  12/1990  Japan .

Primary Examiner—Peter M. Cuomo
Assistant Examiner—Stephen Vu
Attorney, Agent, or Firm—Burns, Doane, Swecker & Mathis, LLP

[57] ABSTRACT

A headrest apparatus for a vehicle seat including a guide member for being mounted on a seat-back of the seat, a rotational member rotatably supported to the guide member, a stay slidably supported to the guide member and the rotational member with the capability to be detached from the guide member and the rotational member, a headrest body attached to the stay and positioned to the normal position and a stored position by a rotation of the rotational member relative to the guide member, a spring member connected between the guide member and the rotational member and rotates the rotational member so that the headrest body is positioned to the stored position and an contacting wall formed to the guide member with the capability of making contact with the end of the stay when the headrest body is positioned to the stored position.

12 Claims, 9 Drawing Sheets

6,074,010

HEADREST APPARATUS FOR VEHICLE SEAT

FIELD OF THE INVENTION

The present invention generally relates to a headrest apparatus for a vehicle seat.

BACKGROUND OF THE INVENTION

A headrest apparatus for a vehicle seat is disclosed in Japanese Utility Model No. 2(1993)-46755.

The headrest apparatus includes a guide member, a rotational member, a stay and a headrest body. The guide member is mounted on a seat-back of the vehicle seat. The rotational member is rotatably supported to the guide member. The stay is slidably passed through the guide member and the rotational member. Also, the stay is able to pass out through the guide member and the rotational member and thereby detach from the guide member and the rotational member. The headrest body is attached to the stay.

When the stay is inserted through the rotational member and the guide member (the first action of the stay), the rotational member can not rotate relative to the guide member. Therefore, the headrest body is positioned to a normal position which supports a head portion of a passenger of the vehicle seat. When the stay passes out of the guide member and is only inserted through the rotational member (the second action of the stay), the rotational member can be rotated relative to the guide member. Therefore, the headrest body is positioned to a stored position. When the stay completely passes out of the guide member and the rotational member (the third action of the stay), the headrest body is detached to the seat-back of the vehicle seat.

However, in this case, when the stay is detached from the rotational member and the guide member, the rotational member is not positioned in any determined position. Therefore, the work efficiency for attaching the stay through the rotational member decreases.

SUMMARY OF THE INVENTION

A need exists, therefore, for a headrest apparatus which addresses at least the foregoing drawback of the prior art.

According to the present invention, the headrest apparatus for a vehicle seat includes a guide member for being mounted on a seat-back of the seat, a rotational member rotatably supported to the guide member, a stay slidably supported to the guide member and the rotational member with the capability to be detached from the guide member and the rotational member, a headrest body attached to the stay and positioned to the normal position and a stored position by a rotation of the rotational member relative to the guide member, a spring member connected between the guide member and the rotational member which the spring member rotates the rotational member so that the headrest body is positioned to the stored position and an contacting wall formed to the guide member with the capability of making contact with the end of the stay when the headrest body is positioned to the stored position.

BRIEF DESCRIPTION OF THE DRAWING FIGURES

The foregoing and additional features of the present invention will become more apparent from the following detailed description of preferred embodiment thereof when considered with reference to the attached drawings, in which.

DETAILED DESCRIPTION OF THE PREFERRED EMBODIMENT

Hereinafter a headrest apparatus according to first embodiment of the present invention is explained with reference to FIGS. 1–8.

Figure 10:
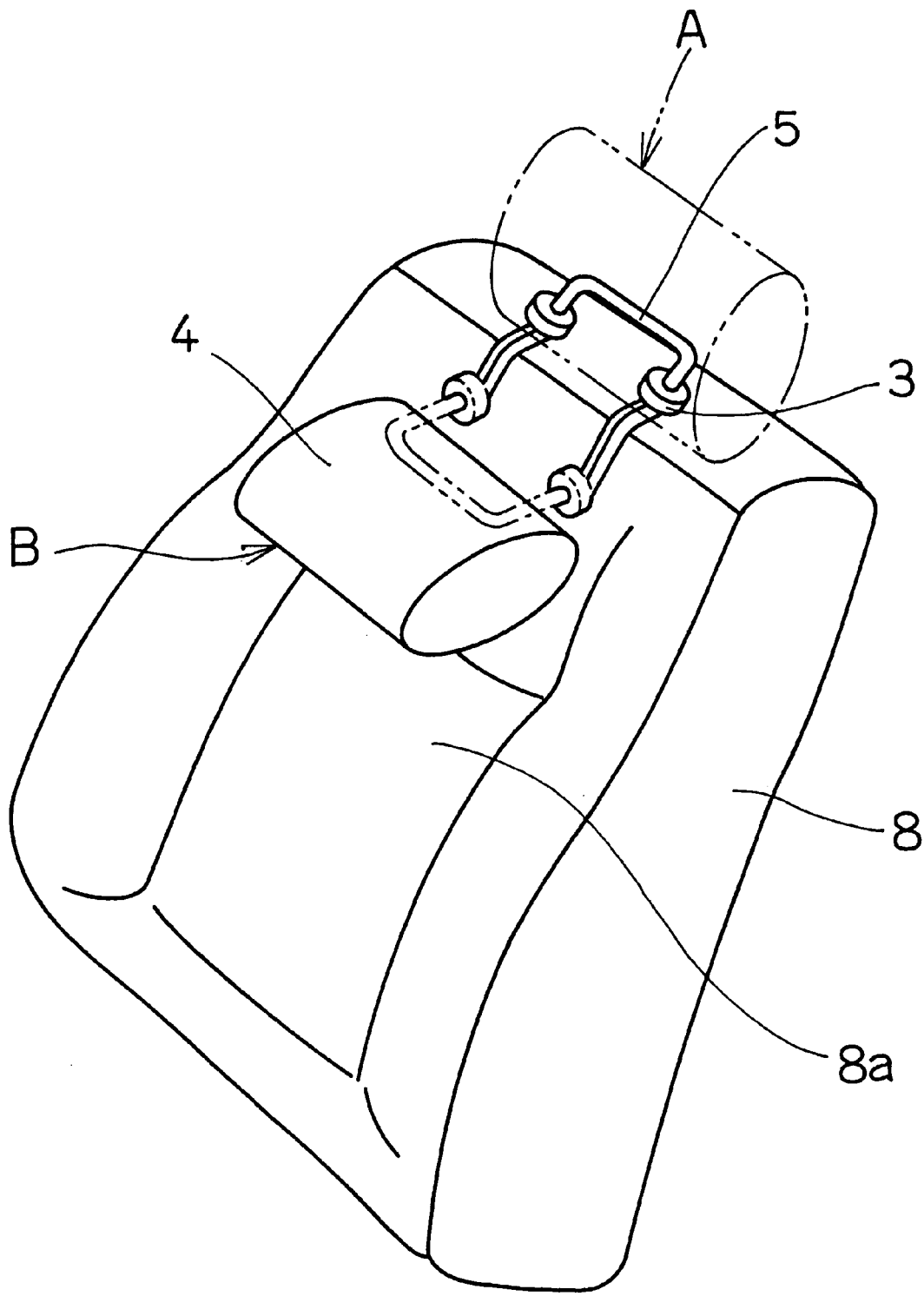
FIG. 10 is a perspective view of the alternative normal and stored headrest body position.

As shown in FIGS. 1–4, A head rest apparatus 1 includes a base bracket 2, a holder 3, a stay 5 and a headrest body 4. A base bracket 2 is arranged in a seat back 8 (seat back 8 is shown in FIG. 10) which supports the back of a passenger sitting on a vehicle seat. The holder 3 is rotatably supported to the base bracket 2. The headrest body 4 is supported to the stay 5. The stay 5 is slidably supported to the base bracket 2 and the holder 3. The headrest body 4 is positioned to a normal position A. When the headrest body 4 is positioned to the normal position, the headrest body 4 supports a head of the passenger.

Figure 7:
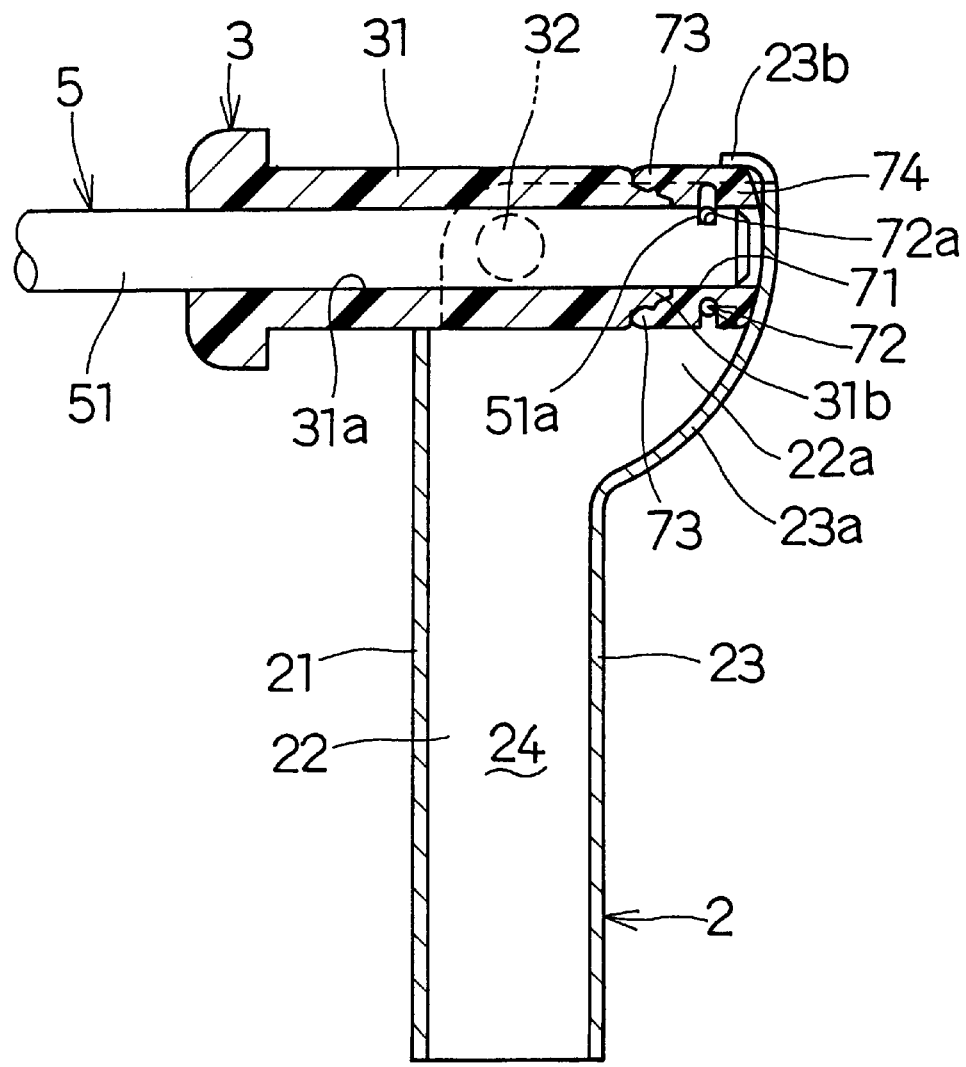
FIG. 7 is a cross-sectional view, when the stay of the first embodiment of the headrest apparatus according to the present invention, after rotation of the rotational member following the second action.
Figure 6:
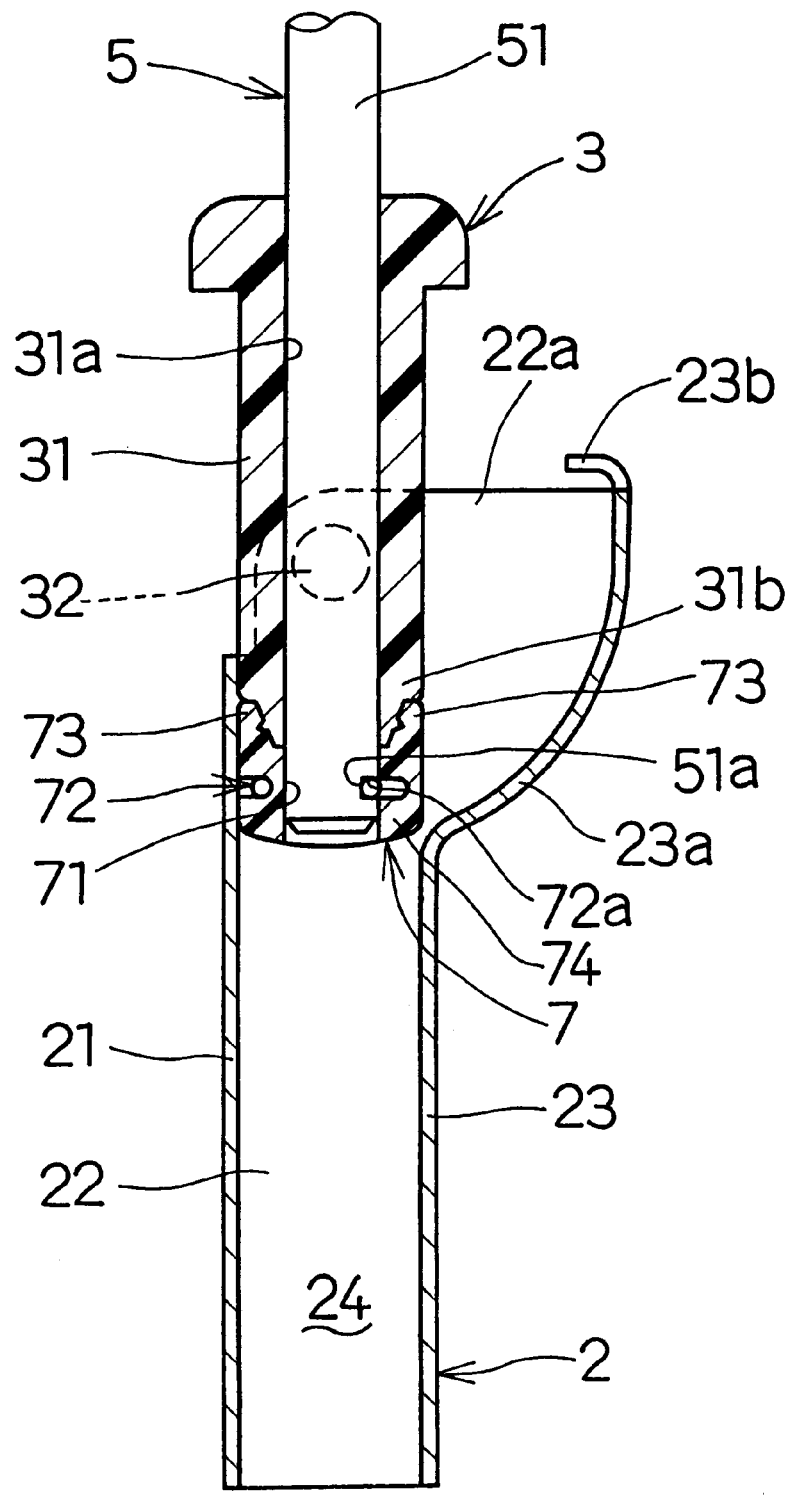
FIG. 6 is a cross-sectional view, when a stay of the first embodiment of the headrest apparatus according to the present invention has completed the second action.

The headrest body 4 is positioned to the stored position B by the rotation of the holder 3 relative to the base bracket 2 (as shown in FIGS. 7 and 10).

The base bracket 2 is formed in one sheet. The base bracket 2 has a front wall 21, a pair of side walls 22 and a pair of rear walls 23. The front wall 21 is arranged parallel or approximately parallel to a passenger support surface 8a (as shown in FIG. 10) of the seat back 8. The side walls 22 are integrally connected to side edges of the front wall 21 so as to be projected toward the rear direction at right angles relative to the front wall 21, and are arranged parallel to each other. The rear walls 23 are integrally connected to rear edge of the side walls 22 so as to be arranged parallel to the front wall 21 and each of the rear walls 23 are arranged on the same plane. A pair of spaces 24 are formed between the front wall 21 and the rear walls 23. The base bracket 2 is fixed to a frame of the seat back 8 at the rear walls 23 by bolts. The side walls 22 and the rear walls 23 have extending portions 22a, 23a. The extending portions 22a are extended in the upward direction from an upper edge of the side walls 22 so as to be projected above the upper edge of the front wall 21. The extending portions 23a are extended in the upward direction from an upper edge of the rear walls 23 so as to be projected above the upper edge of the front wall 21. The extending portions 23a of the rear walls 23 are integrally connected to an rear edge of the extending portions 22a of the side walls 22. The extending portions 23a of the side walls 23 rotatably support the holder 3. The extending portions 23a of the rear walls 23 are formed in semi-circular shape with reference to the rotational axis of the holder 3 as the center.

The holder 3 includes a pair of support portions 31 and a shaft portion 32. The support portions 31 are formed in cylindrical shape and have a through hole 31a. The shaft portion 32 is arranged between the support portions 31 and integrally connected to the support portion 31 at each end of the shaft portion 32. The projecting axis portions 33 are formed in the outer side surface of each of the support portions 31. The projecting axis portions 33 are arranged on same axis of the shaft portion 31. The projecting axis portions 33 are rotatably supported to the extending portions 23a of the side walls 23 of the base bracket 2 so that the support portions 31 are oppositely positioned to the extending portions 23a of the rear wall 23 of the base bracket 2. Therefore, the holder 3 is rotatably supported to the base bracket 2 at axis line of the shaft portion 32 and the projecting axis portions 33. A spiral spring 6 is supported around the shaft portion 32 of the holder 3. One end of the spiral spring 6 is engaged to the shaft portion 32 and other end of the spiral spring 6 is engaged to the front wall 21 of the base bracket 2. Therefore, the holder 3 rotates toward the counter-clockwise direction in FIG. 3 by a biasing force of the spring 6. The stoppers 23b are formed in the ends of the extending portions 23a of the rear wall 21. The stoppers 23b make contact with the support portions 31 of the holder 3, when the headrest body 4 is positioned in the stored position.

The stay 5 includes a pair of leg portions 51. A piece 7 is arranged between the leg portions 51 and detachably coupled to a lower end of the leg portions 51 at each end of the piece 7. The leg portions 51 are slidably passed through the through hole 31a of the support portions 31 of the holder 3 and are slidably guided in the spaces 24 of the base bracket 2 by the piece 7.

Therefore, the rotation of the holder 3 by the biasing force of the spring 6 is prevented by the insertion of the leg portions 51 of the stay 5 into the spaces 24 of the base bracket 2. As a result, the stay 5 slidably supports the holder 3 and the base bracket 2. Therefore, the headrest body 4 is positioned on the normal position A (as shown in FIG. 10). Also, the rotation of the holder 3 by the biasing force of the spring 6 is limited by the contact between the stoppers 23b and the support portions 31. As a result, the stay 5 slidably supports the holder 3. Therefore, the headrest body 4 is positioning on the stored position B (as shown in FIG. 10). Also, the stay 5 detaches from the holder 3 and the base bracket 2. Thereby the leg portions 51 can pass out through the spaces 24 and the support portions 31. Therefore, the headrest body 4 detaches from the seat back 8.

As shown FIGS. 1–4, the piece 7 has a pair of guiding portions 74. The guiding portions 74 are slidably guided between the front wall 21 and the rear walls 23 of the base bracket 2. A through hole 71 is formed in the guiding portions 74. A pair of snaps 72 are fixed to the guiding portions 74 and contain an engage portion 72a. The engage portion 72a crosses the through hole 71 and has the capability to elastically deform. An engage groove 51a is formed in the leg portions 51 of the stay 5 and engages to and disengages from the engage portion 72a. The leg portions 51 of the stay 5 pass through the through hole 71 of the guiding portions 74 of the piece 7. At the same time, the engage groove 51a of the leg portions 51 of the stay 5 engages to the engage portion 72a of the snap 72. Also, when the leg portions 51 pass out from the through hole 71, the engage groove 51a is disengaged from the engage portion 72a. Therefore, the leg portions 51 detach from the piece 7. As a result, the leg portions 51 are able to pass out through the support portions 31 while being guided out through the spaces 24.

A pair of wall portions 73 are formed in the guiding portions 74 oppositely each other. The though hole 71 is arranged between the wall portions 73. A holding portion 31b is formed in a lower portion of the support portions 31 of the holder 3 and is engaged to and disengaged from the wall portions 73 of the guiding portions 74 of the piece 7. When the leg portions 51 of the stay 5 are guided downward through the spaces 24 of the base bracket 2, the wall portions 73 of the guide portion 74 of the piece 7 are disengaged from the holding portion 31b of the support portion 31 of the holder 3. Correspondingly, when the leg portion 51 are guided upward through the spaces 24, the wall portions 73 make contact with and engage to the holding portions 31b. Therefore, when the wall portions 73 are engaged to the holding portion 31b, the piece 7 holds the support portions 31 of the holder 3.

Figure 1:
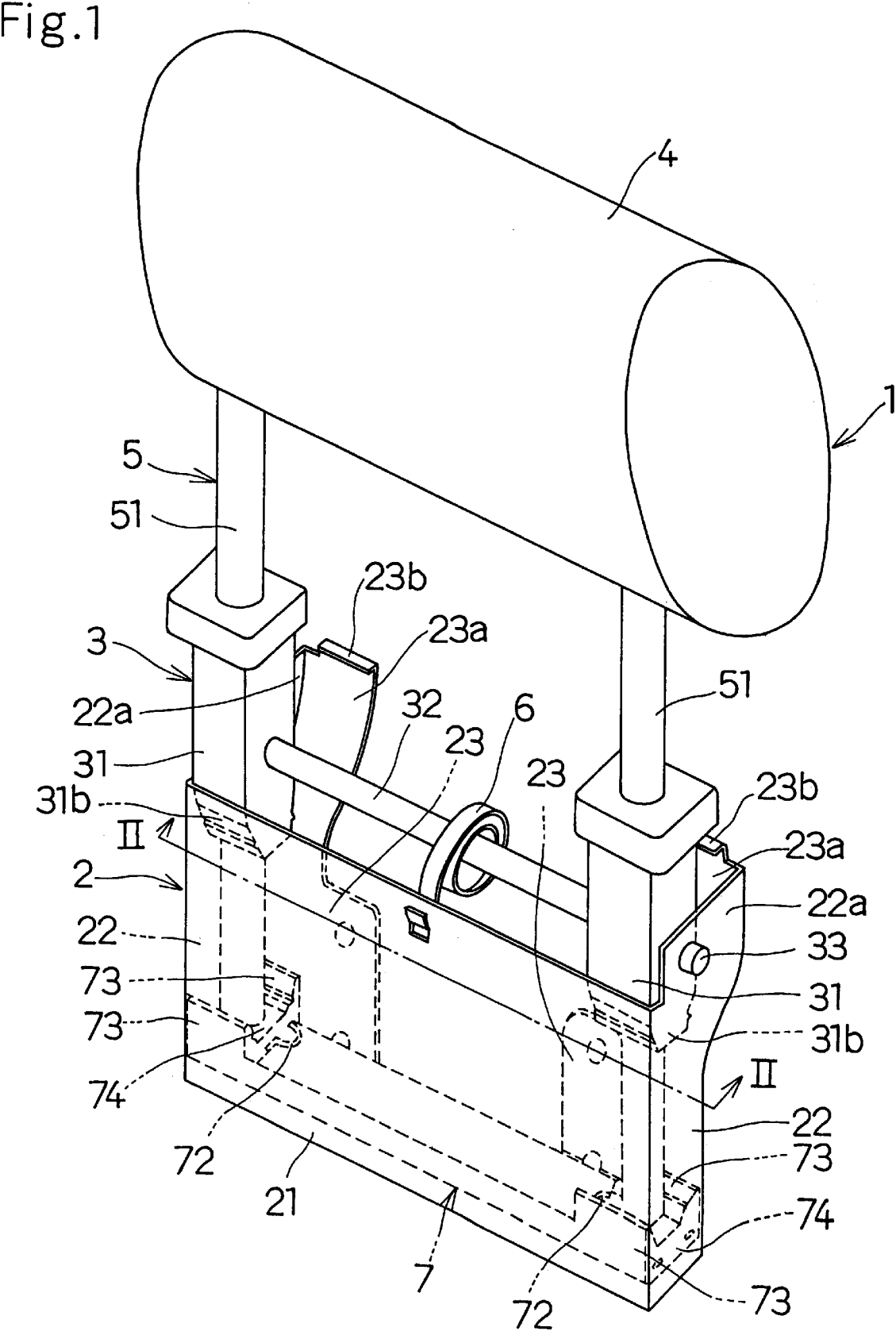
FIG. 1 is a perspective view of a first embodiment of the headrest apparatus according to the present invention.
Figure 2:
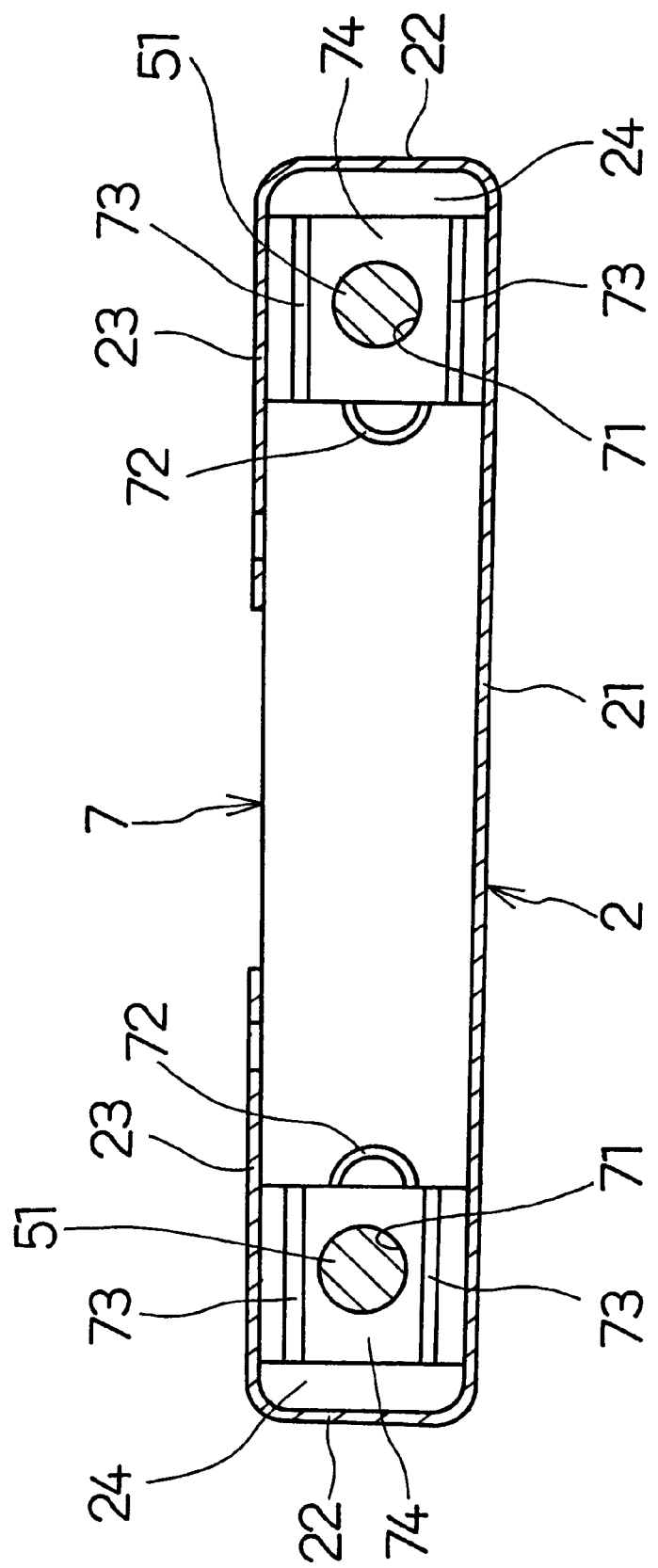
FIG. 2 is a cross-sectional view taken along line II—II in FIG. 1.
Figure 3:
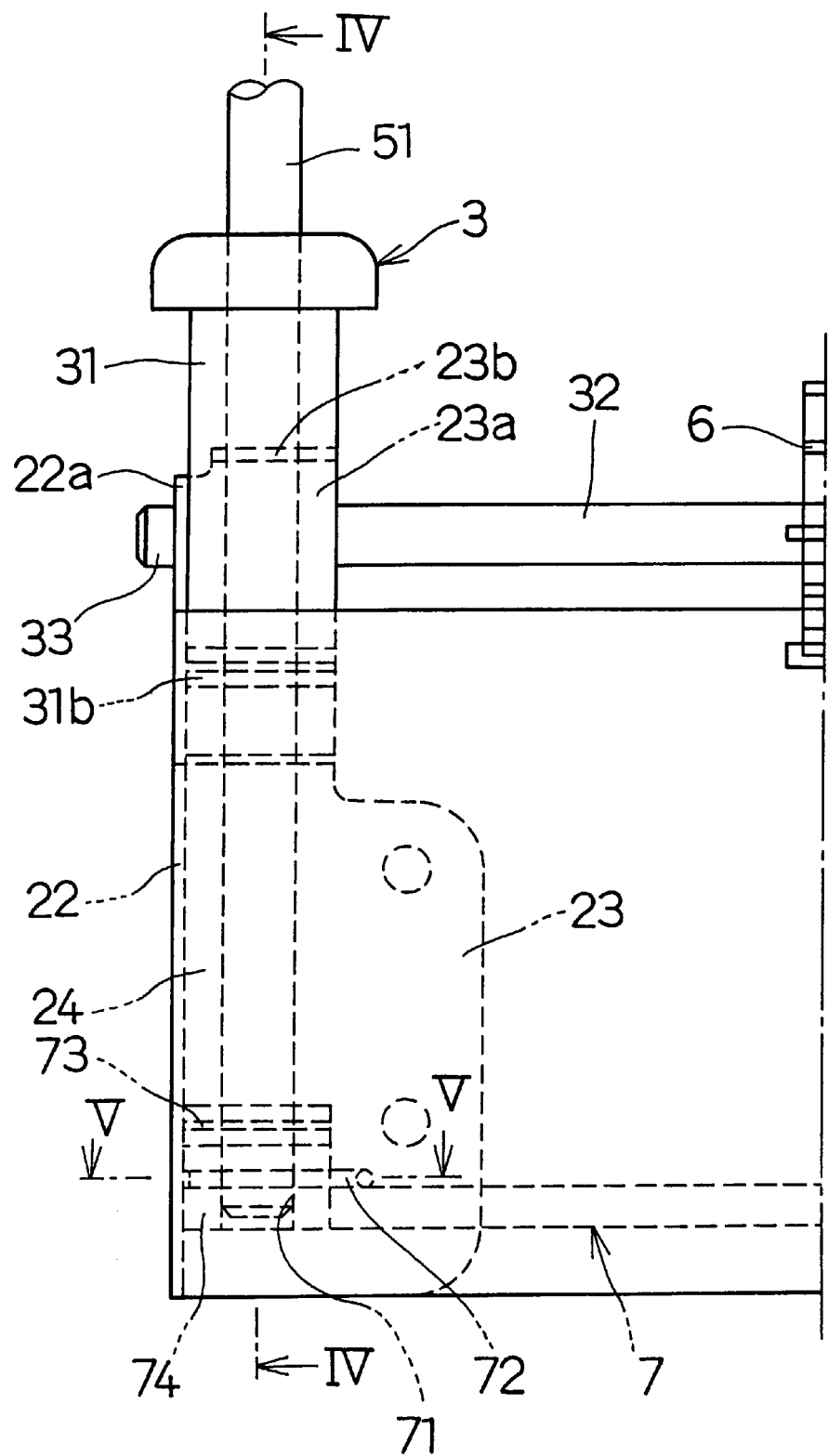
FIG. 3 is a front view of a first embodiment of the headrest apparatus according to the present invention.
Figure 4:
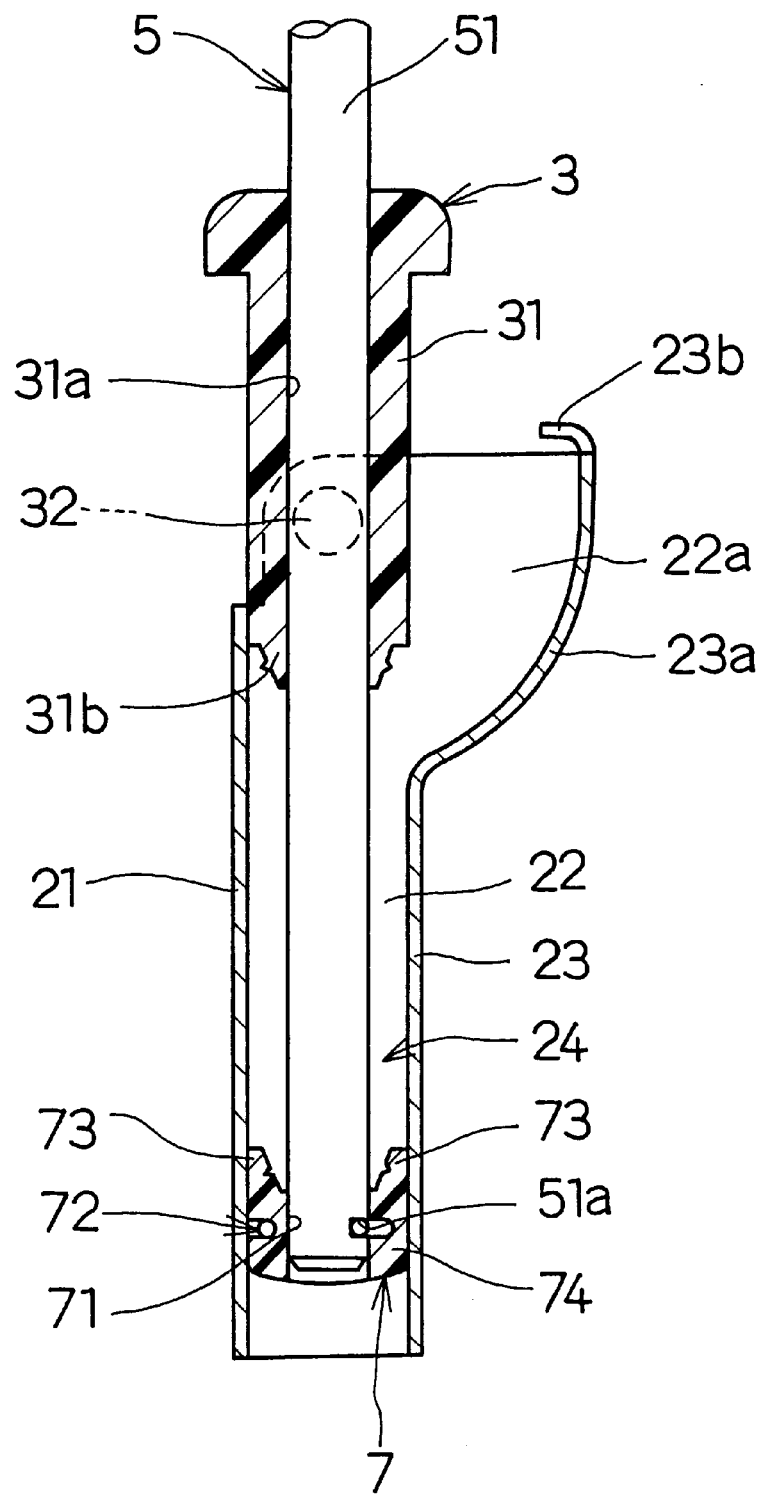
FIG. 4 is a cross-sectional view taken along line IV—IV in FIG. 3, when the stay of the first embodiment of the headrest apparatus according to the present invention has completed the first action.
Figure 5:
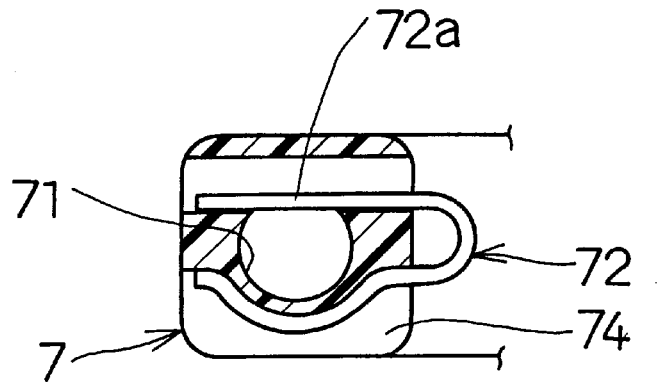
FIG. 5 is a cross-sectional view taken along line V—V in FIG. 3.

As shown FIG. 4, the stay 5 is slidably supported to the holder 3 and the base bracket 2. The headrest body 4 is positioned to the normal position A (as shown in FIG. 10).

When the headrest body 4 moves in the upward direction, the leg portions 51 of the stay 5 are guided out the spaces 24 of the base bracket 2. When the wall portions 73 of the guiding portions 74 come into contact with the holding portions 31b of the support portions 31, the wall portions 73 of the guiding portions 74 are engaged to the holding portion 31b of the support portion 31. Therefore, the holder 3 rotates along the extending portions 23a by biasing force of the spring 6 (as shown in FIG. 7). As a result, the headrest body 4 is positioned to the stored position B (as shown in FIG. 10).

Figure 8:
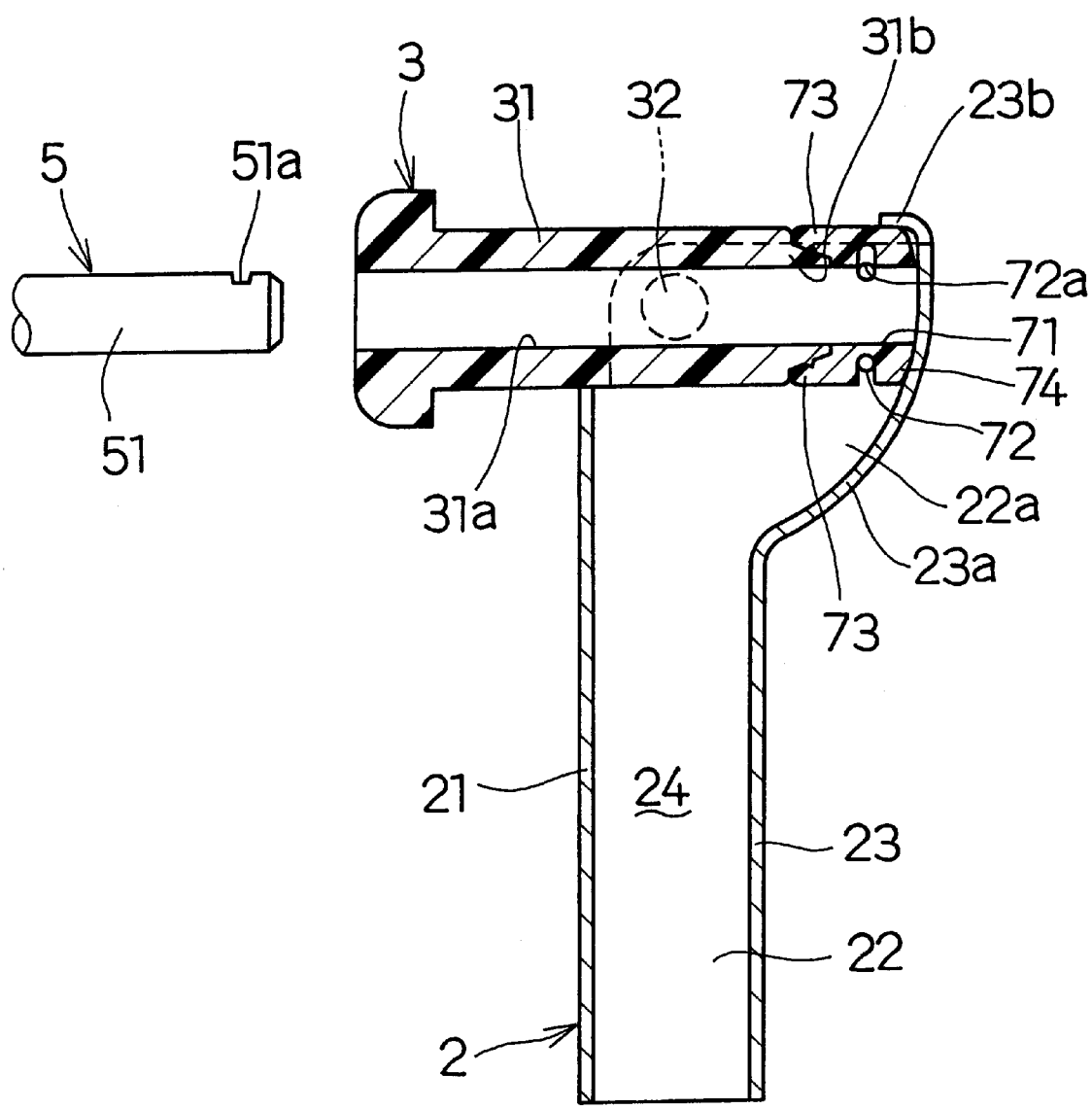
FIG. 8 is a cross-sectional view when the stay of the first embodiment of the headrest apparatus according to the present invention has completed the third action.

As show in FIGS. 7 and 8, the stay 5 is pulled outward from the holder 3, the leg portions 51 of the stay 5 detach from the piece 7 and thereby the engage portion 72a of the snaps 72 is disengaged from to the engage groove 51a of the leg portions 51. Thus, the leg portions 51 are able to be passed out through the through hole 31a of the support portions 31 of the holder 3. In this manner, the stay 5 detaches from the holder 3 and the base bracket 2. As a result, the headrest body 4 detaches the seat back 8. At this time, the support portions 31 are held at the stored position B by the biasing force of the spring 6 so as to be contacting to the stopper 23b. Also, because the piece 7 is held to the support portion 31, the wall portions 73 are thereby engaged to the holding portion 31b.

As shown in FIG. 8, when the stay 5 is pushed into the through hole 31a of the support portions 31, the leg portions 51 of the stay 5 pass through the through hole 31a and into the attached the piece 7. Therefore, during this action, the stay 5 is slidably supported to the holder 3. At this time, the leg portion 51 makes contact with the extending portion 23a of the base bracket 2. Therefore, the degree of the pass through of the leg portion 51 relative to the support portions 31 is limited by the extending portion 23a.

After that, the holder 3 may be rotated against the biasing force of the spring 6. After such rotation, the headrest body 4 may be moved in the downward direction. Therefore, the leg portions 51 of the stay 5 are guided in the spaces 24 of the base bracket 2 by the piece 7. As a result, the stay 5 is slidably supported to the holder 3 and the base bracket 2 (as shown in FIG. 4).

Figure 9:
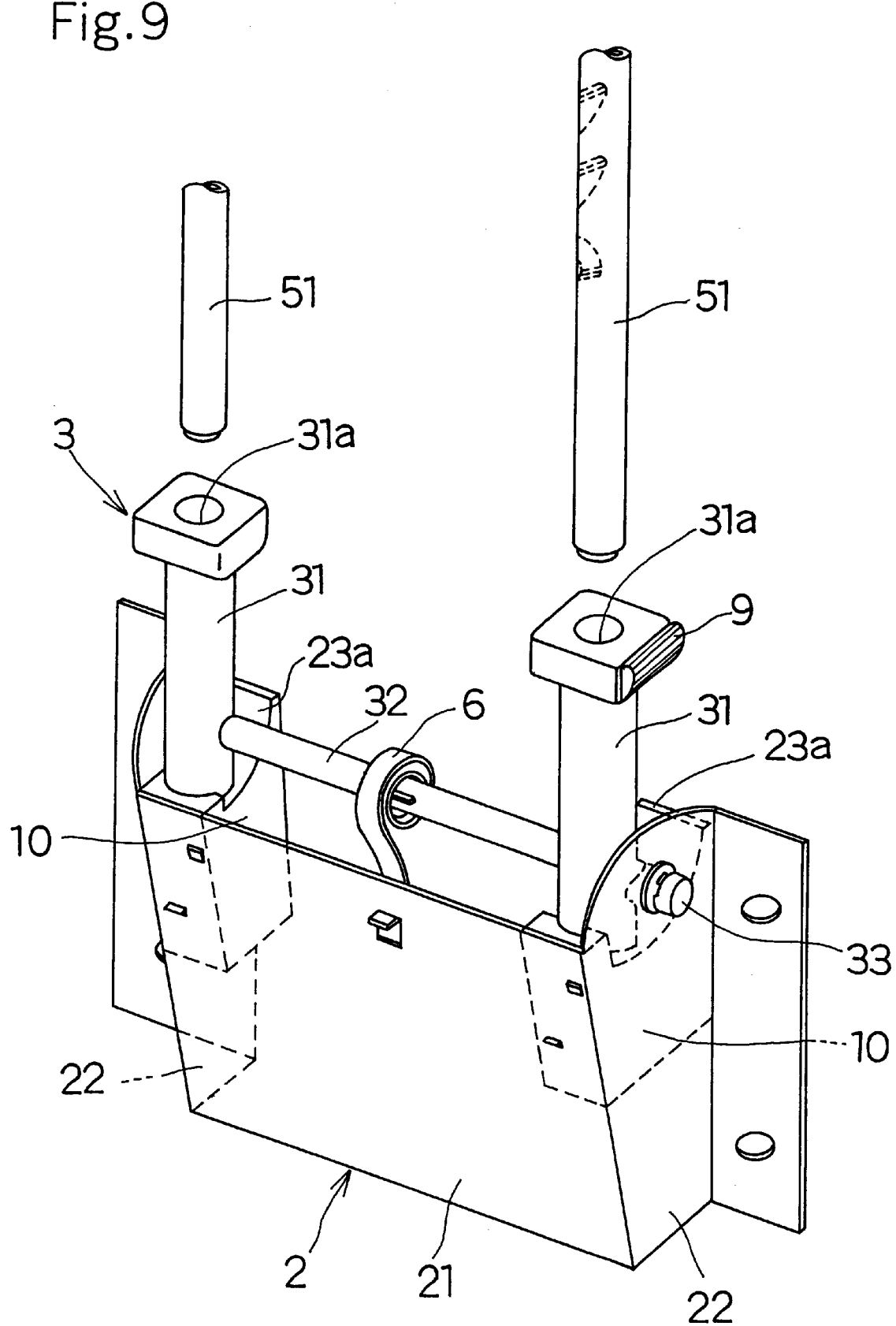
FIG. 9 is a perspective view of a second embodiment of the headrest apparatus according to the present invention.

Hereinafter a headrest apparatus according to second embodiment of the present invention is explained with reference to FIG. 9.

A pair of guide blocks 10 are fixed to the front wall 21 of the base bracket 2. The leg portions 51 of the stay 5 are slidably guided to the guide blocks 10. Therefore, the rotation of the holder 3 by the biasing force of the spring 6 is prevented by the insertion of the leg portions 51 of the stay 5 into to the guide blocks 10. A lock mechanism 9 is mounted on one of the support portions 31 of the holder 3. The lock mechanism 9 is engaged and disengaged from one of the leg portions 51 of the stay 5. Therefore, when the lock mechanism 9 is disengaged, the leg portions 51 of the stay 5 may be passed out through the support portions 31 and the guide block 10. As a result, the stay 5 detaches from the holder 3 and the base block 2.

The principles, and the preferred embodiments described herein are illustrative and not restrictive, the scope of the invention being indicated in the appended claims and all variations which come within the meaning of the claims are intended be embraced therein.

What is claimed is:

1. A headrest apparatus for a vehicle seat comprising;

a guide member for being mounted on a seat-back of the seat, a rotational member rotatably supported to the guide member, a stay slidably supported to the rotational member and detachable from the guide member and the rotational member, a headrest body attached to the stay and positionable in a normal position and a stored position by rotation of the rotational member relative to the guide member, a spring member connected between the guide member and the rotational member for urging the rotational member so that the headrest body is positioned in the stored position, and a contacting wall formed on the guide member to be contacted by an end of the stay when the headrest body is positioned at the stored position.

2. A headrest apparatus according to claim 1, wherein the stay includes a pair of leg portions, the rotational member including a pair of support portions each provided with a through hole through which one of the leg portions passes.

3. A headrest apparatus according to claim 1, wherein the guide member includes a base bracket for being fixed to the seat back, said base bracket forming a pair of passages which guide the stay and said base bracket forming the contacting wall.

4. A headrest apparatus according to claim 1, wherein the guide member includes a base bracket for being fixed to the seat back and a guide block fixed to the base bracket, said guide block forming the contacting wall, the stay being guided in the guide block.

5. A headrest apparatus according to claim 1 further comprising a piece detachably coupled to the stay and engageable with and disengageable from the rotational member.

6. A headrest apparatus according to claim 1 further comprising a lock mechanism mounted on the rotational member and engageable with and disengageable from the stay.

7. A headrest apparatus for a vehicle seat comprising:

a guide member adapted to be mounted on a seat back of the seat, said guide member possessing a contacting wall;

a holder rotatably supported on the guide member, said holder being provided with a through hole having an axis;

a stay slidably supported in the through hole in the holder and detachable from the holder;

a headrest body attached to the stay, the headrest body being rotatable with respect to the guide member by virtue of rotation of the holder between an upright normal position and a downwardly rotated stored position, the axis of the through hole in the holder intersecting said contacting wall of said guide member when the headrest body is positioned in said stored position; and a spring member operatively associated with the holder for applying a force to the holder urging the headrest body towards the stored position.

8. The headrest apparatus according to claim 7, wherein said guide member includes a stopper which engages the holder when the holder is in the stored position.

9. The headrest apparatus according to claim 7, wherein said contacting wall of said guide member possesses a semi-circular shape.

10. The headrest apparatus according to claim 7, including a guiding portion provided with a through hole and a snap, said snap including an engaging portion, one end of said stay being positioned in said through hole in the guiding portion and being engaged by said engaging portion of said snap to secure said guiding portion relative to said stay.

11. The headrest apparatus according to claim 7, wherein said guide member includes a base bracket having a space for guiding movement of said stay.

12. The headrest apparatus according to claim 7, wherein said guide member includes a base bracket and a guide block fixed to the base bracket, said stay being guided within said guide block.

* * * * *